United States Patent [19]
Petersen

[11] 3,717,702
[45] Feb. 20, 1973

[54] PROCESS FOR TREATING PHOSPHATE ORE

[75] Inventor: Alfred W. Petersen, Salt Lake City, Utah

[73] Assignee: Stauffer Chemical Company, New York, N.Y.

[22] Filed: Feb. 2, 1971

[21] Appl. No.: 112,035

[52] U.S. Cl. ................................. 423/320, 423/321
[51] Int. Cl. ........................................... C01b 25/16
[58] Field of Search ........................... 23/165, 107

[56] References Cited

UNITED STATES PATENTS

| | | | |
|---|---|---|---|
| 3,493,340 | 2/1970 | Bosen et al. | 23/165 |
| 3,359,067 | 12/1967 | Henrickson et al. | 23/109 |
| 1,944,048 | 1/1934 | Walker et al. | 23/165 |

*Primary Examiner*—Oscar R. Vertiz
*Assistant Examiner*—Gregory A. Heller
*Attorney*—Daniel C. Block, Edwin H. Baker, Albert J. Adamcik and Harry A. Pacini

[57] ABSTRACT

A process of treating phosphate ore prior to the wet process phosphoric acid that comprises the addition of an acid material or acid forming material to a calcined or uncalcined finely divided phosphate ore to form a solution that dissolves the Mg and Ca carbonate or oxide impurities. The pH of the solution is maintained at a range of from 2.0 – 5.0. The ore is retained in the acid medium a sufficient length of time to dissolve the above-noted impurities and then separated therefrom. The ore is then treated in the conventional manner to recover its phosphoric acid content.

5 Claims, No Drawings

PROCESS FOR TREATING PHOSPHATE ORE

DESCRIPTION OF THE INVENTION

Most phosphate rock contains magnesium and other impurities that are objectionable. In the production of wet process phosphoric acid by digestion of the rock with sulfuric acid, the magnesium dissolves in the phosphoric acid. The magnesium forms insoluble compounds when the phosphoric acid is reacted with ammonia to form fertilizer. These insoluble compounds represent a loss of available plant food.

The magnesium forms water insoluble precipitates in neutral liquid fertilizers made by reacting ammonia with highly concentrated wet process phosphoric acid or superphosphoric acid.

Decreasing the magnesium content of phosphate rock is desirable to alleviate the above problems.

The basic raw materials utilized in the process of this invention are phosphate rock and sulfuric acid or sulfur dioxide. The phosphate rock is ground to a size sufficiently small so that acid leaching of the magnesium impurities at the surface of the particles can occur. The rock should not be ground so fine as to make separation from the leach liquor difficult. A particle size range of 5-70 percent by weight through a 200 mesh size screen is satisfactory, while 10-40 percent by weight is preferred.

The phosphate rock may be treated or purified before leaching if desired. Treatments, such as heating, calcination, washing, and flotation may improve the purity or quality of the phosphate rock. If the rock is calcined, a temperature of from about 1,300° to about 1,600° F is preferred.

Sulfuric acid, phosphate rock and water are fed simultaneously into a reaction vessel equipped with an agitator, thermometer and pH probe. When using sulfur dioxide, it would be bubbled into the slurry of rock and water to form sulfurous acid. A sufficient amount of sulfuric acid or sulfur dioxide is used to dissolve the available basic materials in the rock. The reactants can also be introduced intermittently or batchwise, but a simultaneous addition is preferred. Whatever method of addition is used, the pH of the reaction mixture is maintained between 2.0-5.0 during the mixing. The control of pH is critical. A pH too high does not allow sufficient dissolving of the magnesium impurities, while a pH too low dissolves too much valuable phosphate.

The reaction mixture is agitated constantly during the reaction period, which is about 0.25-8 hours and preferably 1-3 hours. During this reaction period, the pH is controlled at between 2.0 and 5.0 by addition of acid as needed. The reaction time should be sufficiently long at the conditions chosen in order to decrease the magnesium content to the desired level.

The reaction temperature should be kept in the range of 10°-80° C. and preferably 40°-65° C. Normally, heating is required. Steam coils or other heating means may be used, but live steam bubbled into the reaction vessel is preferred. A higher temperature allows the reaction to occur in less time, and a smaller reaction vessel may be used.

The percent by weight of solids in the reaction mixture should be high in order to minimize the amount of liquor that must be separated from the phosphate rock. The percent solids should not be so high that the reaction mixture cannot be pumped or agitated. The percent by weight of solids may be in the range of 5-65 and preferably 40-50. The percent solids does not affect the chemical efficiency of leaching the magnesium impurities.

The reaction mixture is withdrawn from the reaction vessel and the phosphate rock are separated from the liquid phase by conventional means such as filtration settling or centrifuging while maintaining the pH at from 2.0 to 5.0. The liquid phase will contain the Mg impurities and is discarded or rejected. The rock is washed with water or other suitable liquor. The phosphate rock, having a much lower Mg content, can now be introduced into the conventional digesting system for recovering phosphoric acid by the wet process using sulfuric acid.

In order to illustrate the merits of the present invention, reference is made to the following examples.

EXAMPLE 1

A sample of ground phosphate rock calcined at 1400°-1,450° F. was analyzed and determined to contain 13.4 percent by weight -325 mesh size, 31.0 percent by weight $P_2O_5$ and 0.57 percent be weight MgO. To a reaction vessel containing a thermometer and pH probe was added 200 grams of water and 200 grams of rock to form a 50 percent by weight solids slurry and sufficient 25 percent by weight sulfuric acid to provide a pH of 3.3-3.5. The temperature was controlled at about 63° C. for 1.5 hours, and the pH was also controlled to 3.3-3.5 by the addition of 25 percent by weight sulfuric acid as required. The reaction mixture was agitated continuously. After the reaction, the mixture was filtered. The filter cake was washed with water and dried at 82° C. The dried cake analyzed 31.1 percent by weight $P_2O_5$ and 0.31 percent by weight MgO. Analysis of the filtrate showed that only 0.8 percent of the $P_2O_5$ had dissolved.

EXAMPLE 2

A sample of uncalcined, ground phosphate rock was analyzed and determined to contain 11.9 percent by weight of -200 mesh size, 31.0 percent by weight $P_2O_5$, and 0.71 percent by weight MgO. Said sample was treated by the same process and under the same conditions as in Example 1 above. The dried filter cake analyzed 30.1 percent by weight $P_2O_5$ and 0.18 percent by weight MgO. Analysis of the filtrate showed that only 0.6 percent of the $P_2O_5$ had dissolved.

Other tests were made on uncalcined, ground phosphate rock by the process of Example 1 above but with the conditions varied. The results of the tests including the above Example 2 test are tabulated below in Table I.

TABLE I

| Example number | Leaching agent | Rock analysis | | | Leaching conditions | | | | Dry cake analysis | | Filtrate, percent of $P_2O_5$ dissolved |
|---|---|---|---|---|---|---|---|---|---|---|---|
| | | Percent $P_2O_5$ by wt. | Percent MgO by wt. | Percent size -200 mesh | pH | Temp., °C. | Time, hrs. | Percent solids by wt. | Percent $P_2O_5$ by wt. | Percent MgO by wt. | |
| 2 | $H_2SO_4$ | 31.0 | 0.71 | 11.9 | 3.3-3.5 | 63 | 1.5 | 50 | 30.1 | 0.18 | 0.6 |
| 3 | $H_2SO_4$ | 31.0 | 0.71 | 11.9 | 3.3-3.5 | 44.5 | 1.0 | 25 | 30.7 | 0.50 | |

TABLE I—Continued

| Example number | Leaching agent | Rock analysis ||| Leaching conditions ||||  Dry cake analysis || Filtrate, percent of P₂O₅ dissolved |
| | | Percent P₂O₅ by wt. | Percent MgO by wt. | Percent size −200 mesh | pH | Temp., °C. | Time, hrs. | Percent solids by wt. | Percent P₂O₅ by wt. | Percent MgO by wt. | |
|---|---|---|---|---|---|---|---|---|---|---|---|
| 4 | H₂SO₄ | 31.0 | 0.71 | 11.9 | 3.3–3.5 | 63 | 1.0 | 25 | 31.5 | 0.30 | 0.7 |
| 5 | H₂SO₄ | 31.0 | 0.71 | 11.9 | 3.0 | 63 | 1.0 | 25 | 30.0 | 0.20 | 3.4 |
| 6 | H₂SO₄ | 31.0 | 0.71 | 11.9 | 3.0 | 51.5 | 1.0 | 25 | 30.4 | 0.27 | 1.9 |
| 7 | H₂SO₄ | 31.0 | 0.71 | 11.9 | 3.0 | 38 | 1.0 | 25 | 32.6 | 0.38 | 1.7 |
| 8 | H₂SO₄ | 31.0 | 0.71 | 11.9 | 3.0 | 38 | 2.0 | 25 | 30.1 | 0.24 | 3.4 |
| 9 | H₂SO₄ | 31.0 | 0.71 | 11.9 | 3.0 | 38 | 3.0 | 25 | 29.9 | 0.20 | 3.3 |
| 10 | H₂SO₄ | 31.0 | 0.71 | 11.9 | 2.5 | 21.5 | 1.0 | 25 | 28.5 | 0.39 | 12.0 |
| 11 | H₂SO₄ | 31.0 | 0.71 | 62 | 2.5 | 23 | 1.0 | 25 | 29.6 | 0.66 | 5.2 |
| 12 | H₂SO₄ | 31.0 | 0.71 | 62 | 2.5 | 47 | 1.0 | 25 | 27.2 | 0.21 | 9.8 |
| 13 | H₂SO₄ | 30.6 | 1.21 | | 4.5 | 26 | 1.0 | 25 | 30.5 | 0.82 | |
| 14 | SO₂ | 30.6 | 1.21 | 11.5 | 2.5 | 13 | 3.0 | 25 | 32.9 | 0.63 | 0.4 |
| 15 | SO₂ | 30.6 | 1.21 | 11.5 | 2.5 | 21 | 3.0 | 25 | 32.9 | 0.51 | 0.5 |
| 16 | SO₂ | 30.6 | 1.21 | 11.5 | 2.5 | 41.5 | 3.0 | 25 | 33.7 | 0.21 | 0.7 |
| 17 | SO₂ | 31.4 | 0.89 | 17.0 | 2.2 | 27 | 3.0 | 25 | 33.4 | 0.27 | 1.8 |
| 18 | SO₂ | 31.4 | 0.89 | 17.0 | 2.5 | 33 | 3.0 | 50 | 33.7 | 0.45 | 0.5 |
| 19 | SO₂ | 31.4 | 0.89 | 17.0 | 2.5 | 32 | 6.0 | 25 | 34.1 | 0.28 | 0.7 |
| 20 | SO₂ | 31.1 | 0.72 | 9.1 | 2.2 | 43.5 | 3.0 | 25 | 34.3 | 0.22 | 3.8 |

What is claimed is:

1. In a process of manufacturing phosphoric acid by the digestion and reaction of finely divided, uncalcined phosphate ore with sulfuric acid, the improvement comprising the steps of:
   a. contacting said finely divided uncalcined phosphate ore, prior to its digestion and reaction with sulfuric acid with a sufficient equivalent amount of aqueous acidic material to react with the available basic material present in said ore,
   b. leaching a substantial portion of the magnesium impurities from said ore by maintaining contact between said ore and the aqueous acidic material at a pH value for the leaching mixture of said ore and aqueous acidic phase of from about 2.0 to about 5.0,
   c. causing the pH value of the mixture of ore and aqueous media to remain at a value of from 2.0 to about 5.0,
   d. separating the leached ore from the majority of the aqueous phase while the pH value of the mixture of leached ore and aqueous media is from 2.0 to about 5.0, whereby the majority of the dissolved magnesium impurities and a minimal amount of dissolved phosphate is separated from the ore,
   e. rejecting the said separated aqueous phase containing the dissolved magnesium impurities from the phosphoric acid process, and
   f. introducing the leached purified phosphate ore into the sulfuric acid digestor-reactor system of a wet-process phosphoric acid process, whereby said purified ore is converted into purified phosphoric acid.

2. The process of claim 1 wherein said aqueous acidic material comprises sulfuric acid.

3. The process of claim 1 wherein said aqueous acidic material comprises sulfur dioxide.

4. The process of claim 1 wherein the temperature of said leaching step (b) is maintained at between about 10° to about 80° C.

5. The process of claim 1 wherein the solids content of said leaching mixture ranges between about 5 and 65 percent by weight having a particle size range of about 5 to about 70 percent by weight through a 200 mesh size screen.

* * * * *